April 3, 1951 H. E. KIRSCHNER 2,547,826
HOSE REEL
Filed March 18, 1946
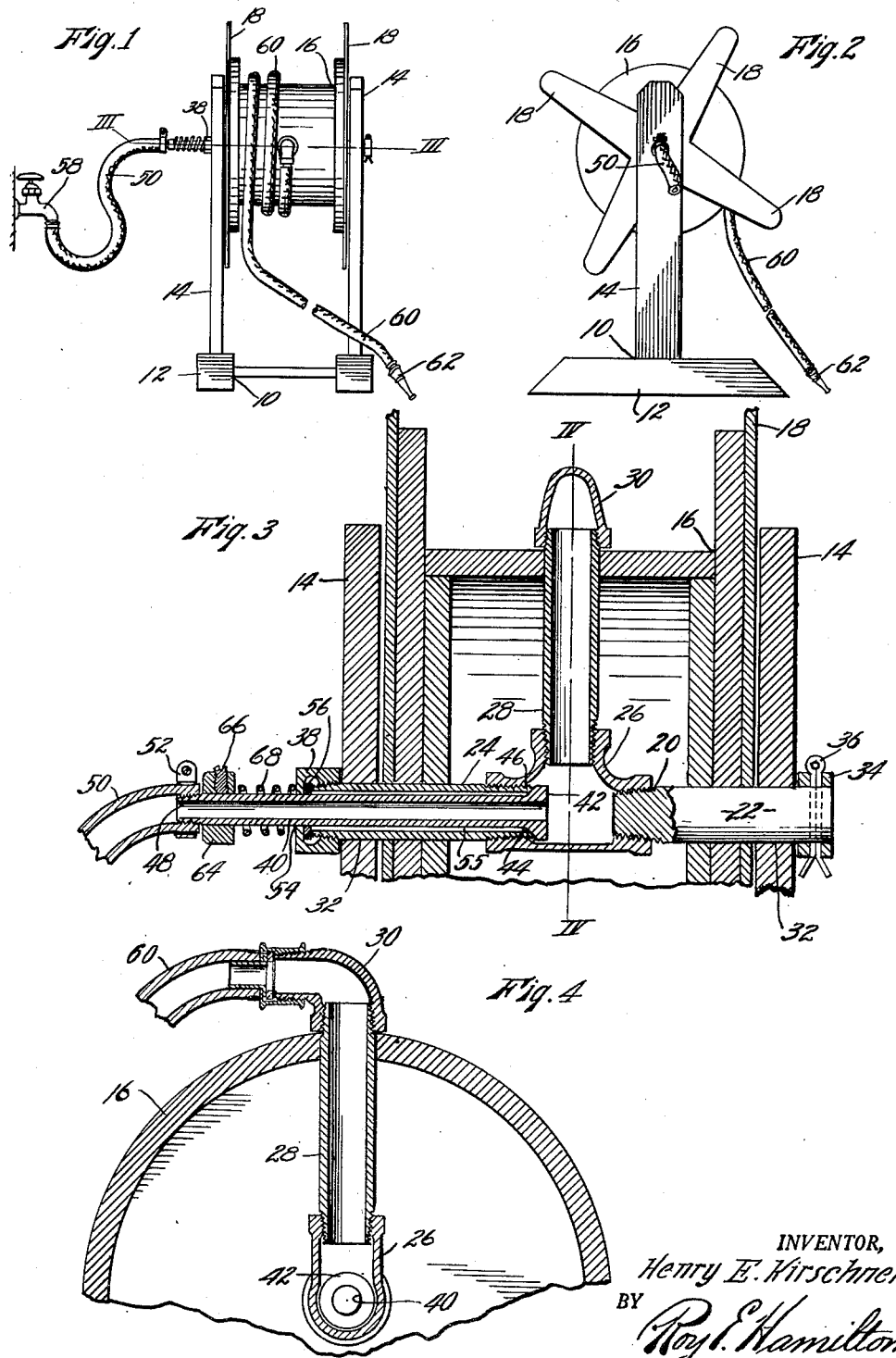
INVENTOR,
Henry E. Kirschner.
BY Roy E. Hamilton,
Attorney.

Patented Apr. 3, 1951

2,547,826

UNITED STATES PATENT OFFICE 2,547,826

HOSE REEL

Henry E. Kirschner, St. Joseph, Mo.

Application March 18, 1946, Serial No. 655,114

1 Claim. (Cl. 299—78)

This invention relates to improvements in hose reels, and has for its principal object the provision of a hose reel provided with a hose connecting means whereby a hose wrapped about a rotatable reel drum is operatively interconnected with a non-rotatable water pressure line.

Another object of the present invention is the provision of a hose reel having a drum provided with a conduit having an axially disposed rotatable joint whereby said reel may be connected in series between a non-rotatable pressure water supply line and a hose adjustably carried by the hose drum of said reel.

A further object is the provision of a hose reel comprising a frame carrying a rotatably mounted hose drum having a hollow axle closed at its one end and provided at its other end portion with a rotary conduit joint, one member of which is stationary with said drum and the other member being normally stationary with said frame.

Other objects are simplicity and economy of construction and efficiency and ease of operation.

With these objects in view, as well as other objects which will appear during the course of the specification, reference will be had to the drawing within:

Figure 1 is a front elevation of the hose reel shown in operative relation with a water supply line and embodying this invention.

Fig. 2 is an end elevation of the hose reel.

Fig. 3 is an enlarged fragmentary sectional view taken on line III—III of Figure 1.

Fig. 4 is a sectional view taken on line IV—IV of Figure 3.

Throughout the several views like reference characters refer to similar parts and the numeral 10 designates a frame having a base 12 and spaced apart, parallel standards 14 between which is rotatably mounted a flanged hose drum 16 provided with radial operating arms 18 by means of which it may be easily rotated to wind and unwind the hose 14 mounted thereon. This hose drum is provided with composi'e fixed axle 20 comprising a rod 22 and a tube 24 joined together at the central portion of the drum by means of a T-pipe fitting 26. A tube 28 operatively fitted into the T-fitting 26 extends radially through the wall of the drum to receive angled hose fitting 30 at the periphery of said drum.

The rod 22 and tube 24 are in axial alignment and respectively extend through bearing openings 32 in standards 14 to permit rotation of the drum in the frame. The extended end of rod 22 is provided with a sleeve 34 secured to the rod by means of cotter key 36, and the extended end of tube 24 is provided with sleeve nut 38. This nut and sleeve preclude longitudinal movement of the axle in the frame.

A pipe 40 extends through tube 24 to extend into the T-pipe fitting 26 and outwardly beyond the sleeve nut 38. The inner end of pipe 40 is provided with an outwardly flanged head 42 having a conical seat 44 which is adapted to engage the formed end 46 of tube 24 to form a watertight joint. The outer extremity of pipe 40 is undulated at 48 to receive a hose 50. This hose is secured in position by clamp 52.

The sleeve nut 38 has a reduced concentric opening 54 in its outer face to receive pipe 40. This outer positioning of pipe 48, together with the conical inner bearing, insures a centering of the pipe in tube 24. Furthermore, due to reduced diameter of pipe 40, a chamber 55 is formed between the bodies of the pipe and tube. This chamber may be filled with a suitable sealing material such as grease. A leather gasket 56 is positioned between the outer end of tube 24 and the inner wall of the sleeve nut 38, as shown in Figure 3, to further seal the space between the pipe 40 and tube 24.

Mounted on pipe 40 adjacent hose 50 is an adjustable sleeve 64 held against movement by set screw 66. Between sleeve 64 and sleeve nut 38 and coiled about pipe 40 is a compression spring 68 which functions to maintain the inner joint between tube 24 and pipe 40 tight and at the same time permit the tube to turn relative to the pipe.

As shown in Figure 1 the hose 50 is adapted to be attached to a sill cock 58 whereby water may be passed to the hose through pipe 48, pipe fitting 26, tube 28, angled hose fitting 30 and into hose 60 which is adapted to be extended any desired distance from the reel by unwinding it from the drum. When the watering operation is complete the operator simply closes the sill cock and manually rotates drum 16 to wind the hose 60 on the drum.

It will be noted that the hose 60 may be wound off and on the drum without interfering with the flow of water from the hose nozzle 62. Furthermore, the hose connection with the water supply line always remains intact so that by simply turning the sill cock a supply of water will be delivered to nozzle regardless of the position of the hose on the reel.

What I desire to protect by Letters Patent is:

In a hose reel comprising a frame and a hose drum mounted for rotation in said frame, a rotary coupling comprising a hollow axle stationary in said drum and having its inner end formed to present a seat, a radially disposed tube communicating with the inner end of said axle and extending to the periphery of said drum for connection with the extremity of a hose, a stationary pipe mounted for relative rotation in said axle, said pipe being adapted to be connected at its outer end with a source of water and having at its inner end a radial flange adapted to engage rotatably said seat, and a spring urging said flange into contact with said seat, a sealed hollow being provided between said pipe and said axle to contain a fluid packing material.

HENRY E. KIRSCHNER.

REFERENCES CITED

The following references are of record in the file of this patent:

UNITED STATES PATENTS

| Number | Name | Date |
| --- | --- | --- |
| 988,766 | Frigon | Apr. 4, 1911 |
| 1,046,909 | Wagner | Dec. 10, 1912 |
| 1,350,205 | Anderson | Aug. 17, 1920 |
| 1,417,459 | Cox | May 23, 1922 |
| 1,489,398 | Paul | Apr. 8, 1924 |
| 1,659,788 | Sif-Kovitz | Feb. 21, 1928 |
| 1,886,207 | Marshall et al. | Nov. 1, 1932 |
| 1,901,660 | Lund | Mar. 14, 1933 |